US010307752B2

(12) United States Patent
Tsuchiya et al.

(10) Patent No.: US 10,307,752 B2
(45) Date of Patent: Jun. 4, 2019

(54) METHOD FOR PRODUCING POLYMER, AND POLYMER (71) Applicant: Mitsubishi Chemical Corporation, Tokyo (JP)

(72) Inventors: Seiji Tsuchiya, Yokohama (JP); Shinichi Maeda, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/409,827

(22) PCT Filed: Jun. 25, 2013

(86) PCT No.: PCT/JP2013/067368
§ 371 (c)(1),
(2) Date: Dec. 19, 2014

(87) PCT Pub. No.: WO2014/002994
PCT Pub. Date: Jan. 3, 2014

(65) Prior Publication Data
US 2015/0190800 A1 Jul. 9, 2015

(30) Foreign Application Priority Data

Jun. 26, 2012 (JP) ................................ 2012-142968
Dec. 3, 2012 (JP) ................................ 2012-264381

(51) Int. Cl.
*B01J 41/12* (2017.01)
*C08G 63/685* (2006.01)
*C08G 63/91* (2006.01)
*B01J 39/18* (2017.01)

(52) U.S. Cl.
CPC .............. *B01J 41/12* (2013.01); *B01J 39/18* (2013.01); *C08G 63/6856* (2013.01); *C08G 63/916* (2013.01)

(58) Field of Classification Search
CPC ..................................................... B01J 41/12
See application file for complete search history.

(56) References Cited

U.S. PATENT DOCUMENTS

| | | | |
|---|---|---|---|
| 2,802,820 A | 8/1957 | Zech et al. | |
| 2,839,506 A | 6/1958 | Cooke et al. | |
| 4,007,113 A | 2/1977 | Ostreicher | |
| 4,007,114 A | 2/1977 | Ostreicher | |
| 4,596,660 A | 6/1986 | Hou | |
| 4,606,824 A | 8/1986 | Chu et al. | |
| 4,859,340 A | 8/1989 | Hou et al. | |
| 5,238,776 A * | 8/1993 | Zampini | G03F 7/0226 430/165 |
| 5,500,127 A * | 3/1996 | Carey | B01J 39/046 210/685 |
| 6,103,122 A * | 8/2000 | Hou | B01J 20/28028 162/164.2 |
| 2001/0009936 A1 * | 7/2001 | Suzuki | C08G 77/34 524/35 |
| 2003/0180559 A1 | 9/2003 | Wayton et al. | |
| 2006/0014098 A1 | 1/2006 | Hada et al. | |
| 2006/0057491 A1 | 3/2006 | Wayton et al. | |
| 2006/0267487 A1 | 11/2006 | Ozaki et al. | |
| 2007/0167645 A1 | 7/2007 | Fies et al. | |
| 2007/0269741 A1 * | 11/2007 | Iijima | C08F 220/28 430/270.1 |
| 2009/0317740 A1 * | 12/2009 | Hiroi | G03F 7/11 430/270.1 |
| 2011/0045404 A1 | 2/2011 | Imamura et al. | |

FOREIGN PATENT DOCUMENTS

| | | |
|---|---|---|
| GB | 2 043 734 | 10/1980 |
| JP | 36 20045 | 10/1961 |
| JP | 52-97928 | 8/1977 |
| JP | 60 181124 | 9/1985 |
| JP | 61188417 A * | 8/1986 |
| JP | 63 17486 | 4/1988 |
| JP | 1-228560 A | 9/1989 |
| JP | 5-249669 A | 9/1993 |
| JP | 2000 516133 | 12/2000 |
| JP | 2001 350266 | 12/2001 |
| JP | 2004 212975 | 7/2004 |
| JP | 2004184842 A * | 7/2004 |
| JP | 2005 346051 | 12/2005 |
| JP | 2006 328223 | 12/2006 |
| JP | 2009 104165 | 5/2009 |
| JP | 2010 189563 | 9/2010 |
| JP | 2010 209338 | 9/2010 |
| JP | 2012 207058 | 10/2012 |
| JP | 2012-224833 A | 11/2012 |
| JP | 5158382 | 3/2013 |
| TW | 200743908 A | 12/2007 |
| WO | 98 04348 | 2/1998 |
| WO | 2007 148627 | 12/2007 |

OTHER PUBLICATIONS

English machine of translation of Ariyoshi (JP 2004-184842).*
Derwent abstract of Kaneko et al. (JP 61-188417).*
International Search Report dated Sep. 10, 2013 in PCT/JP13/067368 Filed Jun. 25, 2013.
Combined Taiwanese Office Action and Search Report dated Jun. 21, 2016 in Patent Application No. 102122591 (with English translation).
Office Action dated May 9, 2017 in Japanese Patent Application No. 2013-530467 (with unedited computer generated English translation).
Office Action dated Dec. 19, 2017, in Japan Patent Application No. 2013-530467, (with English-language Translation), citing document AO.

* cited by examiner

Primary Examiner — Michael F Pepitone
(74) Attorney, Agent, or Firm — Oblon, McClelland, Maier & Neustadt, L.L.P.

(57) ABSTRACT

A method for producing a polymer of the present invention includes the following steps (a) and (b):
  step (a): producing a polymer in the presence of an acid or base catalyst; and
  step (b): contacting a solution containing the polymer obtained in step (a) to a mixed resin of an anion-exchange resin and a cation-exchange resin.

11 Claims, 2 Drawing Sheets

METHOD FOR PRODUCING POLYMER, AND POLYMER

FIELD OF THE INVENTION

The present invention relates to a method for producing a polymer and to the polymer.

The present application is based upon and claims the benefit of priority to Japanese Patent Application Nos. 2012-142968, filed Jun. 26, 2012, and 2012-264381, filed Dec. 3, 2012. The entire contents of these applications are incorporated herein by reference.

DESCRIPTION OF BACKGROUND ART

In the process for manufacturing semiconductor elements, liquid-crystal devices or the like, resist film is formed on a substrate, and the resist film is then exposed to light and developed so as to form resist patterns.

Resist patterns have rapidly become finer in recent years as lithographic technology develops further. To form finer patterns, it is an option to shorten irradiation wavelengths. In particular, irradiation wavelengths are shifting from g-line (wavelength: 438 nm) or i-line (wavelength: 365 nm) to deep ultraviolet (DUV) with a wavelength of 300 nm or shorter. Nowadays, lithographic technology using KrF excimer lasers (wavelength: 248 nm) or ArF excimer lasers (wavelength: 193 nm) is employed.

Also, EUV (wavelength: 13.5 nm) lithography with even shorter wavelengths is now being researched. In addition, electron-beam lithographic technology and immersion technology to conduct exposure treatment in liquid such as water or the like are being studied intensively.

In a lithographic process, other than resist film, various thin films such as antireflection film, gap-fill film, top coat film and the like are also used. To form such films, material containing a polymer is usually used.

In the process for manufacturing high-density ICs, computer chips, computer hard drives or the like, metal contamination often causes an increase in defects and a reduction in manufacturing yield, resulting in lower performance of such products.

For example, if impurities of metals such as sodium or iron (metal ions, metal powders, transition metal complexes and the like) are present in a polymer used in a lithographic process, metal contamination may occur during a removal process by plasma.

As fine-process technologies such as lithographic technologies advance, electronic devices are becoming more precise, making the aforementioned problems harder to solve completely. Metal impurities at a very low concentration level are often observed to cause a decrease in performance and stability of semiconductor devices. Especially, light metals such as sodium and heavy metals such as iron are known as main causes of those problems when they are contained in a polymer to be used in a lithographic process. Moreover, metal impurities contained in a polymer at a concentration lower than 100 ppb are identified to cause an adverse impact on performance and stability of electronic devices.

Conventionally, metal impurity concentrations in a polymer have been controlled by selecting material that has passed strict regulations governing impurity concentrations or by conducting thorough process management so that metal impurities will not be mixed into a polymer during its production process. However, as regulations for metal impurity concentrations are becoming even stricter, it is necessary to produce a polymer by a method capable of performing essential controls on metal contamination.

A method is proposed for reducing metal impurities in a polymer by passing a polymer solution through a filter that does not contain a strongly acidic ion-exchange group but contains a charge control agent for generating zeta potential (patent publication 1).

Also, another method proposed is conducted by combining the following steps: in step (T1), a polymer solution is set to come in contact with a cation-exchange resin; in step (T2), the polymer solution is set to come in contact with a mixed resin of a cation-exchange resin and an anion-exchange resin; and in step (T3), the polymer solution is set to pass through a filter that contains material charged with positive zeta potential (patent publication 2).

PRIOR ART PUBLICATION

Patent Publication

[Patent Publication 1] JP 2010-189563A
[Patent Publication 2] JP 2010-209338A

SUMMARY OF THE INVENTION

Problems to be Solved by the Invention

When a polymer is produced by polymerizing monomers in the presence of an acid or a base catalyst, the acid or base catalyst as well as metal impurities will remain as a contaminant in the obtained polymer. The same as metal impurities, impurities derived from an acid or base catalyst will adversely affect the performance and stability of semiconductor devices.

In addition, when monomers are polymerized in the presence of an acid catalyst, polymerization reactions are stopped by use of a basic compound as a reaction terminator. On the other hand, when monomers are polymerized in the presence of a base catalyst, polymerization reactions are stopped by use of an acidic compound as a reaction terminator. Those reaction terminators will also remain in a polymer as impurities and adversely affect the performance and stability of semiconductor devices.

When a polymer is produced in the presence of an acid catalyst, the polymer contains impurities derived from the acid catalyst and impurities derived from the reaction terminator (basic compound). On the other hand, when a polymer is produced in the presence of a base catalyst, the polymer contains impurities derived from the base catalyst and impurities derived from the reaction terminator (acidic compound). Therefore, it is necessary to reduce concentrations of such impurities contained in a polymer.

Here, impurities derived from an acid catalyst and a reaction terminator (acidic compound) are collectively referred to as "acidic impurities," and impurities derived from a base catalyst and a reaction terminator (basic compound) are collectively referred to as "basic impurities."

However, when a specific type of filter is used as described in patent publication 1 to fully reduce metal impurity concentrations as well as acid and basic impurity concentrations in a polymer, multiple filters were required to be used. Thus, the productivity of the polymer per sheet of filter decreases as the number of filters increases. In addition, since the filter for removing metal impurities is expensive, use of multiple filters will cause an increase in production cost.

Patent publication 2 relates to a method for producing a (meth)acrylic copolymer, and no description is provided if acidic or basic impurity concentrations are reduced.

The present invention was carried out in consideration of the above problems. Its objective is to provide a highly efficient method for producing a polymer having low metal impurity concentrations and fully reduced concentrations of acidic and basic impurities. The objective also includes providing a polymer in which metal impurity concentrations are low while concentrations of acidic and basic impurities are also fully reduced.

Solutions to the Problems

The inventors of the present invention carried out intensive studies and focused on the order to follow for refining a polymer. Namely, the inventors have come up with a highly efficient method for producing a polymer, that is, when a solution containing a polymer obtained in the presence of an acid or base catalyst, or a solution containing the polymer purified through reprecipitation, is set to come in contact with a mixed resin of an anion-exchange resin and a cation-exchange resin, not only metal impurity concentrations but also concentrations of acidic and basic impurities are fully reduced in the polymer. In addition, the inventors have completed the present invention upon having determined that metal impurity concentrations as well as concentrations of acidic and basic impurities will further decrease by passing a solution containing the polymer through a specific filter after the solution has made contact with a mixed resin.

Namely, the present invention is characterized by the following aspects:

<1> A method for producing a polymer, including the following steps (a) and (b):
step (a): producing a polymer in the presence of an acid or base catalyst; and
step (b): contacting a solution containing the polymer obtained in step (a) to a mixed resin of an anion-exchange resin and a cation-exchange resin.
<2> The method for producing a polymer described in <1>, in which the mass ratio of the cation-exchange resin and the anion-exchange resin (anion-exchange resin/cation-exchange resin) is 60/40 to 99/1.
<3> The method for producing a polymer described in <1> or <2>, in which a crosslinking agent is attached to the side chain of the polymer.
<4> The method for producing a polymer described in any of <1> to <3>, in which the polymer is a polyester-based polymer.
<5> The method for producing a polymer described in any of <1> to <4>, in which the acid catalyst is a sulfonic acid.
<6> The method for producing a polymer described in any of <1> to <4>, in which the base catalyst is a tertiary amine.
<7> The method for producing a polymer described in any of <1> to <6>, further including step (c) below:
step (c): setting a solution containing the polymer obtained in step (b) so that it passes through a filter that does not contain a strongly acidic ion-exchange group but contains a charge control agent for generating zeta potential.
<8> The method for producing a polymer described in <7>, further including step (d) below:
step (d): producing a powdery polymer by mixing a solution containing the polymer obtained in step (c) and a poor solvent for the polymer so that the polymer is deposited.
<9> A polymer, in which the sum of concentrations of acidic and basic impurities is 50 ppm or lower, the metal impurity concentrations of sodium, potassium, calcium and iron are each 80 ppb or lower, and when the polymer is formed into a thin film with a film thickness of 400 nm or less, the refractive index ("n" value) is 1.5 to 2.1 and the extinction coefficient ("k" value) is 0.1 to 0.7 at a wavelength of 193 nm.
<10> The polymer described in <9>, in which the concentration of each metal impurity is 50 ppb or lower.
<11> The polymer described in <9> or <10>, in which the sum of concentrations of acidic and basic impurities is 2 ppm or higher.
<12> The polymer described in any of <9> to <11>, in which a crosslinking agent is attached to the side chain.
<13> The polymer described in any of <9> to <12>, which is a polyester-based polymer.

Effects of the Invention

Using a method for producing a polymer related to the present invention, a polymer with low metal impurity concentrations and sufficiently reduced concentrations of acidic and basic impurities is produced at high productivity.

In addition, in a polymer related to the present invention, metal impurity concentrations are low and concentrations of acidic and basic impurities are also fully reduced.

DETAILED DESCRIPTION OF THE EMBODIMENTS

In the following, embodiments of the present invention are described in detail.

In the present application, acrylic and methacrylic are collectively referred to as "(meth)acrylic."

Also, the weight-average molecular weight (Mw) and Z-average molecular weight (Mz) of a polymer of the embodiments are values each obtained by gel permeation chromatography (GPC) in terms of polystyrene.

The method for producing a polymer related to the present invention includes steps (a) and (b) below. The production method is preferred to further include steps (c) and (d) below.

step (a): producing a polymer in the presence of an acid catalyst or a base catalyst;
step (b): contacting a solution containing the polymer obtained in step (a) to a mixed resin of an anion-exchange resin and a cation-exchange resin;
step (c): setting a solution containing the polymer obtained in step (b) so that it passes through a filter that does not contain a strongly acidic ion-exchange group but contains a charge control agent for generating zeta potential;
step (d): producing a powdery polymer by mixing a solution containing the polymer obtained in step (c) with a poor solvent for the polymer so as to deposit the polymer.

<Step (a)>

Step (a) is for producing a polymer in the presence of an acid or base catalyst.

As described above, when monomers are polymerized in the presence of an acid catalyst, a basic compound is usually used as a reaction terminator to stop polymerization reactions. On the other hand, when monomers are polymerized in the presence of a base catalyst, an acidic compound is used as a reaction terminator to stop polymerization reactions. Thus, more specifically, step (a) is step (a-1) or step (a-2) below.

step (a-1): producing a polymer by polymerizing monomers in the presence of an acid catalyst and by using a basic compound to terminate polymerization reactions; or step (a-2): producing a polymer by polymerizing monomers in the presence of a base catalyst and by using an acidic compound to terminate polymerization reactions.

An acid catalyst is not limited to any specific type: examples include carboxylic acids or their anhydrides such as oxalic acid, maleic anhydride and maleic acid; sulfonic acids and their anhydrides such as p-toluenesulfonic acid, methanesulfonic acid and naphthalene sulfonic acid; sulfuric acid, hydrochloric acid, nitric acid or the like. Among those, sulfonic acids or their anhydrides are preferred, and sulfonic acids are more preferred. Since sulfonic acids and their anhydrides are strongly acidic and highly reactive, and the moisture content that may inhibit condensation polymerization is low, they are preferred as acid catalysts. Such acid catalysts may be used alone or in combination of two or more.

A base catalyst is not limited to any specific type: examples include amines such as diethylamine, triethylamine and pyridine; hydroxides such as sodium hydroxide, sodium carbonate, potassium hydroxide and potassium carbonate; and the like. Among those, amines are preferred because of their low metal content. Especially, tertiary amines (such as triethylamine) are more preferable. Since tertiary amines are strongly acidic and highly reactive and do not contain active hydrogen that tends to cause side reactions, they are preferred as base catalysts.

As an acidic compound to be used as a reaction terminator, those listed above as examples of acid catalysts may be used. Especially, sulfonic acids or their anhydrides are preferred because of their low moisture content. Sulfonic acids are more preferred.

Also, as a basic compound to be used as a reaction terminator, those listed above as examples of base catalysts may be used. Especially, amines are preferred because of their low metal content. Among them, tertiary amines (such as triethylamine) are more preferable, since they do not contain active hydrogen that tends to cause side reactions.

A polymer obtained in the presence of an acid catalyst is not limited specifically: examples are polyester-based polymers, polyether-based polymers, acrylic polymers and the like.

Meanwhile, examples of a polymer obtained in the presence of a base catalyst are not limited specifically, and acrylic polymers, siloxane-based polymers and the like may be listed.

Preferred examples of a polymer are not limited specifically, but polyester-based polymers are especially preferred since they exhibit excellent etching rates and are easier to apply to semiconductor lithographic technology.

A method for producing a polymer is not limited specifically: for example, known methods such as solution polymerization, emulsion polymerization, suspension polymerization, bulk polymerization and the like may be employed. Especially, when the polymer is used in a lithographic process, solution polymerization is preferred.

In the following, step (a) is described in detail using an example for obtaining a polyester-based polymer.

A polyester-based polymer is produced by using the following procedures: monomers such as dicarboxylic acid and diol are dissolved in a polymerization solvent; polycondensation reactions is carried out in the presence of an acid catalyst by heating the mixture to a temperature appropriate for polymerization reactions; the mixture is cooled to an appropriate temperature; and a basic compound is added as a reaction terminator to stop the polycondensation reactions. The polycondensation reactions are preferred to be carried out at 100 to 150° C., more preferably at 120 to 145° C., from the viewpoints of shortening reaction time before reaching the intended molecular weight and achieving precise control of the molecular weight.

A polymerization solvent to be used for the polymerization of a polyester-based polymer is not limited specifically, and it is preferred to select a solvent capable of dissolving any of the monomers, acid catalysts and obtained polymers (polyester-based polymers). Examples of such organic solvents are anisole, 1,4-dioxane, acetone, tetrahydrofuran (THF), methylethyl ketone (MEK), methyl isobutyl ketone (MIBK), toluene, xylene and the like.

In the above polycondensation reactions, it is preferred to control dehydration, dealcoholation reactions and the like by using a monomer such as a dicarboxylic functional group (carboxylic group) protected by an alkyl group. By so doing, gelation or the like is suppressed, and a polyester-based polymer is obtained as a polymer for use in a lithographic process, especially as a polymer for forming antireflection film.

In the polymer obtained in step (a), a crosslinking agent is preferred to be attached to the side chain. Attaching a crosslinking agent to the side chain prevents sublimation of the crosslinking agent that may cause contamination, and process contamination is thereby reduced.

As a crosslinking agent, a compound having a site that absorbs active rays irradiated in a lithographic process may be used: examples are selected from a group containing glycoluril, methylated glycoluril, butylated glycoluril, tetramethoxy glycoluril, methylated melamine resin, N-methoxymethyl-melamine, urethane-urea, amino groups, or vinyl ether.

Especially, glycoluril and tetramethoxy glycoluril are preferred, since polymers are obtained exhibiting excellent properties for forming antireflective film. Also, since they have non-aromatic properties, etching rates improve.

To attach a crosslinking agent to the side chain of a polymer, the crosslinking agent is added to a (reaction) solution containing the polymer for reactions so that the crosslinking agent is attached to the functional group of the polymer. Accordingly, a polymer with a crosslinking agent attached to the side chain is obtained.

Reactions for attaching a crosslinking agent are preferred to be carried out at or below 50° C., more preferably at 15 to 30° C., even more preferably at 18 to 22° C. from the viewpoints of efficient reaction progress and precise molecular weight control.

In the aforementioned step (a), a polyester-based polymer was listed as an example. However, that is not the only option in the present invention. For example, a polymer with a crosslinking agent attached to the side chain is also achieved in step (a) by the following procedures: monomers are polymerized using a polymerization initiator in the presence of a polymerization solvent to form a polymer such as a (meth)acrylic polymer, polyether-based polymer, polyamide-based polymer or the like; and an acid catalyst and a crosslinking agent are added to a solution containing the polymer to carry out reactions for attaching the crosslinking agent.

The polymer obtained in step (a) tends to contain metal impurities and acidic and basic impurities derived from the material or generated during the production process. Such impurities are known to adversely affect the performance and stability of subsequent electronic devices. Thus, it is necessary to conduct step (b) below so that such impurities are reduced to a low concentration level. In addition, if steps (c) and (d) are further conducted after step (b), the impurity concentrations will be removed to an even lower concentration level.

<Step (b)>

In step (b), a solution containing the polymer obtained in step (a) is set to come in contact with a mixed resin of an anion-exchange resin and a cation-exchange resin.

In step (b), it is an option to set the solution containing the polymer directly to come in contact with a mixed resin. Alternatively, after a solution containing the polymer is mixed with a poor solvent for precipitation of the polymer, the deposited polymer is dissolved again to make a solution, which is then set to come in contact with a mixed resin. Especially, a solution that redissolves the polymer deposited in a poor solvent is preferred to come in contact with a mixed resin. When the polymer is deposited using a poor solvent, the polymer is purified through reprecipitation because unreacted monomers, the acid or base catalyst, polymerization initiator, reaction terminator and the like are removed from the polymer.

When a polymer s obtained in step (a) through solution polymerization, the polymerized liquid may be used as a solution containing a polymer without taking any further process.

In addition, if the polymer is purified through a reprecipitation process, the polymerized liquid may be diluted to a proper viscosity using a diluent. Examples of diluents are anisole, 1,4-dioxane, acetone, THF, MEK, MIBK, γ-butyrolactone, propylene glycol monomethyl ether acetate (PGMEA), propylene glycol monomethyl ether (PGME), ethyl lactate, toluene, xylene, 2-hydroxyisobutyric acid methyl (HBM) and the like. Those may be used alone or in combination of two or more.

When a polymer is diluted, it is preferred that the difference be small between the solubility parameter (hereinafter referred to as "SP value") of the solvent in the diluted polymerized liquid (mixture of the polymerization solvent and diluent) and the SP value of the poor solvent used for reprecipitation purification, because the polymer is dispersed well and monomers are removed efficiently.

The SP value of a solvent is obtained by, for example, a method described in "Polymer Handbook," 4th edition, pages VII-675 through VII-711. More specifically, the method is described in Table 1 (page VII-683) and Tables 7 to 8 (pages VII-688 through VII-711). Also, the SP value of a mixed solvent containing multiple solvents is obtained by known methods. For example, because additive properties apply to a mixed solvent, the SP value of a mixed solvent is estimated as the sum obtained by multiplying the SP value and volume fraction of each solvent.

The poor solvent used for reprecipitation purification of a polymer is capable of precipitating the polymer due to its little capability of dissolving the polymer. The type of solvent is different for each polymer. A proper poor solvent is selected from known types according to the composition of the desired polymer.

For example, when a polymer is used for a lithographic process, methanol, 2-propanol, diisopropyl ether, methyl tertiary butyl ether (MTBE), hexane, heptane or water is preferred as the poor solvent because unreacted monomers are efficiently removed. Poor solvents may each be used alone or in combination of two or more.

By filtering the precipitate deposited in a poor solvent, a wet powder polymer purified through reprecipitation is obtained. The polymer is dissolved in a solvent again and is set to come in contact with a mixed resin.

A solvent to redissolve the polymer is not limited specifically as long as it dissolves the polymer. For example, diluents listed above may be used.

A mixed resin used in step (b) is a mixture of an anion-exchange resin and a cation-exchange resin.

An anion-exchange resin mainly works to adsorb and remove the acid catalyst or the acidic compound as a reaction terminator used in step (a). Also, depending on the type of an anion-exchange resin, residual monomers in the polymer may be removed as well. For example, when dicarboxylic acid is used as a monomer to produce a polyester-based polymer, the dicarboxylic acid may be removed to a certain degree by an anion-exchange resin.

Examples of anion-exchange resins are strongly basic anion-exchange resins (type I, type II) and weakly basic anion-exchange resins.

The total exchange capacity of a strongly basic anion-exchange resin is preferred to be 0.8 mg equivalent or greater, more preferably 1.0 mg equivalent or greater, per 1 mL of swollen resin.

The moisture content of a strongly basic anion-exchange resin is preferred to be 75% or less, more preferably 70% or less.

The apparent density of a strongly basic anion-exchange resin is preferred to be 650 to 750 g/L.

The total exchange capacity of a weakly basic anion-exchange resin is preferred to be 1.2 mg equivalent or greater, more preferably 1.5 mg equivalent or greater, per 1 mL of swollen resin; or it is preferred to be 4.6 mg equivalent or greater per 1 gram of dry resin.

The moisture content of a weakly basic anion-exchange resin is preferred to be 70% or less, more preferably 60% or less.

The apparent density of a weakly basic anion-exchange resin is preferred to be 300 to 700 g/L.

A commercially available product may be used for an anion-exchange resin. Examples of such commercially available products of a strongly basic anion-exchange resin are "Amberlite IRA 400," "Orlite DS-2" and "Orlite DS-5" manufactured by Organo Corporation; "Dowex SBR-P C(OH)" and "Dowex MSA-2" manufactured by Wako Pure Chemical Industries, Ltd.; "Diaion PA series," "Diaion HPA25" and "Diaion SA series" manufactured by Mitsubishi Chemical Corporation; and the like.

Examples of commercially available products of a weakly basic anion-exchange resin are "Amberlyst B20-HG·Dry," "Amberlite IRA 96" and "Orlite DS-6" manufactured by Organo; "Dowex 66" manufactured by Wako Pure Chemical; "Diaion WA10," "Diaion WA20" and "Diaion WA30" manufactured by Mitsubishi Chemical; and the like.

On the other hand, a cation-exchange resin works mainly to adsorb and remove metal impurities contained in a polymer, especially light metals such as sodium, potassium and calcium, and the base catalyst or basic compound as a reaction terminator used in step (a).

Examples of a cation-exchange resin are strongly acidic cation-exchange resins and weakly acidic cation-exchange resins.

The total exchange capacity of a strongly acidic cation-exchange resin is preferred to be 1.2 mg equivalent or greater, more preferably 1.5 mg equivalent or greater, per 1 mL of swollen resin; or it is preferred to be 4.7 mg equivalent or greater per 1 gram of dry resin.

The moisture content of a strongly acidic cation-exchange resin is preferred to be 70% or less, more preferably 60% or less.

The apparent density of a strongly basic cation-exchange resin is preferred to be 550 to 900 g/L.

The total exchange capacity of a weakly acidic cation-exchange resin is preferred to be 2.0 mg equivalent or greater, more preferably 2.5 mg equivalent or greater, per 1 mL of swollen resin.

The moisture content of a weakly acidic cation-exchange resin is preferred to be 70% or less, more preferably 60% or less.

The apparent density of a weakly acidic cation-exchange resin is preferred to be 600 to 700 g/L.

A commercially available product may be used for a cation-exchange resin. Examples of such commercially available products of a strongly acidic cation-exchange resin are "Amberlyst 15JS-HG·Dry," "Amberlite IR120B," "Orlite DS-1" and "Orlite DS-4" manufactured by Organo; "Dowex HCR-S" and "Dowex HCR-W2(H)" manufactured by Wako Pure Chemical; "Diaion SK series," "Diaion UBK series" and "Diaion PK series" manufactured by Mitsubishi Chemical; and the like.

Examples of commercially available products of a weakly acidic cation-exchange resin are "Amberlite IRC 76" manufactured by Organo; "Diaion WK series" and "Diaion WK 40L" manufactured by Mitsubishi Chemical; and the like.

The mass ratio of an anion-exchange resin and a cation-exchange resin is preferred to be set as anion-exchange resin/cation-exchange resin=1/99 to 99/1, more preferably 20/80 to 99/1, especially preferably 60/40 to 99/1. Especially when a polymer is a polyester-based polymer, the mass ratio of an anion-exchange resin and a cation-exchange resin is preferred to be within the above range.

If the proportion of a cation-exchange resin is too high, when a crosslinking agent is attached to the side chain of a polymer so that the polymer has a structure capable of reacting with acid, crosslinking reactions are more likely to progress when the polymer comes in contact with a mixed resin. As a result, the chemical structure or molecular weight of the polymer may change after steps (a) and (b), or after the polymer undergoes reprecipitation purification and makes contact with a mixed resin in step (b). Accordingly, the polymer solution may be clouded. On the other hand, if the proportion of an anion-exchange resin is too low, when an acid catalyst is used in step (a), the acid catalyst may not be fully removed in step (b). As a result, crosslinking reactions may progress in a subsequent step so as to cause change in the chemical structure or molecular weight of the polymer.

As described above, acidic and basic impurities in a polymer are removed in step (b). In addition, metal impurities, especially light metals, are mostly removed in step (b).

Furthermore, when step (c) is conducted subsequently, heavy metals, as well as light metals that have not been removed completely in step (b), are removed, and the metal impurity concentrations are lowered even more.

<Step (c)>

In step (c), a solution containing the polymer obtained in step (b) is set to pass through a filter that does not contain a strongly acidic ion-exchange group but contains a charge control agent for generating zeta potential so as to obtain a solution containing the polymer.

When such a filter is used, metal impurities (light metals and heavy metals) contained in a polymer are efficiently removed without causing in the chemical structure of the polymer a change that may occur through reactions with the strongly acidic ion-exchange group. Accordingly, heavy metals, as well as light metals that have not been completely removed by step (b), are removed by using a filter in step (c).

Sulfonic acids or the like may be used for the above strongly acidic ion-exchange group. For example, if a crosslinking agent is attached or the like to the side chain of a polymer so that the polymer has a structure capable of reacting with acid, crosslinking reactions will progress when the polymer passes through a filter that contains a strongly acidic ion-exchange group, thus causing a change in the chemical structure and molecular weight of the polymer. Therefore, using a filter that does not include a strongly acidic ion-exchange group when filtering a polymer solution, the aforementioned crosslinking reactions are suppressed from progressing.

Examples of generally used charge control agents that generate zeta potential are as follows: cationic polyamide-amine-epichlorohydrin resin described in JP S63-17486B; resin obtained by the reaction of N,N'-diethanol-dimethyl-piperazine, melamine, formalin and glycerol phthalate ester described in JP S36-20045B; melamine-formaldehyde cationic resin described in the specification of U.S. Pat. No. 4,007,113; reaction products of dicyandiamide, monoethanolamine and formaldehyde described in the specification of U.S. Pat. No. 2,802,820; aminotriazine resin described in the specification of U.S. Pat. No. 2,839,506; and the like. Among those, cationic polyamide-amine-epichlorohydrin resin is especially preferred since stable cationic electric charges are provided to the filter.

Here, "zeta potential" indicates the surface potential value of the particles dispersed in a liquid phase. A combination of light scattering and electrophoresis is generally employed to measure zeta potential. First, an electric field is applied to the particles to cause mobility (electrophoresis) of the particles, and then laser light is irradiated on the migrating particles to determine the electrophoretic velocity from the shift in the frequencies of the irradiated light and scattering light. As a result, the value of zeta potential is obtained. The zeta potential in the present application indicates the value obtained when a diluted solution with a dispersed charge control agent is measured by using an electrophoretic light scattering method (laser Doppler electrophoresis).

Zeta potential is measured by using a commercially available zeta potential analyzer, for example, "ELS800" manufactured by Otsuka Electronics Co., Ltd., "DT-1200" manufactured by Dispersion Technology Inc., and the like.

The type of a filter to be used in step (c) is not limited specifically, but a sheet type is preferred. The average pore diameter of a filter sheet and the number of sheets to be used are appropriately selected in the production process; the average pore diameter of a filter sheet is preferred to be approximately 0.5 to 10 μm, for example.

The filter used in step (c) may contain a self-supporting fiber matrix. Also, such a self-supporting fiber matrix may contain an immobilized particulate filter aid and a binder resin, if necessary. Moreover, such a particulate filter aid and binder resin are preferred to be distributed uniformly throughout a cross-section of the self-supporting fiber matrix.

Examples of a self-supporting fiber matrix are polyacrylonitrile fibers, nylon fibers, rayon fibers, polyvinyl chloride fibers, cellulose fibers (for example, wood pulp, cotton and the like) and cellulose acetate fibers. Among those, a matrix made of cellulose fibers is preferred.

The cellulose fibers are preferably derived from a cellulose pulp mixture containing an unbeaten cellulose pulp having a Canadian Standard Freeness value of from approximately +400 to approximately +800 mL, and a highly beaten cellulose pulp having a Canadian Standard Freeness value of from approximately +100 to approximately −600 mL, as disclosed in the specification of U.S. Pat. No. 4,606,824.

Examples of the particulate filter aid are diatomaceous earth, magnesia, perlite, talc, colloidal silica, polymeric particulates, polystyrene, polyacrylate, polyvinyl acetate, polyethylene, activated carbon, clay and the like.

Examples of the binder resin are melamine formaldehyde colloids disclosed in the specifications of U.S. Pat. Nos. 4,007,113 and 4,007,114, polyamide-polyamine epichlorohydrin resin disclosed in the specification of U.S. Pat. No. 4,859,340, polyalkylene oxides disclosed in the specification of U.S. Pat. No. 4,596,660 or the like.

A preferred example of a filter that does not contain a strongly acidic ion-exchange group but contains a charge control agent that generates zeta potential is "CUNO™ Zeta Plus™ filter cartridge EC GN grade" manufactured by Sumitomo 3M Ltd., or the like.

When the solution containing a polymer is filtered, its pH is preferred to be 3.5 to 11.0, and the temperature of the solution is preferred to be 0 to 40° C., more preferably 10 to 30° C. When the pH and the temperature of the solution are within the above ranges, crosslinking reactions and hydrolysis of the ester bond are suppressed, and the viscosity is maintained at a level most appropriate for filtration.

In addition, prior to filtering the polymer solution, the filter is preferred to be cleansed using ultrapure water and the solvent of a polymer solution. By filtering the polymer solution after the filter has been cleansed, charged metal impurities are more likely to be adsorbed to the particulate filter aid contained in the filter, and metal impurities are reduced to very low concentration levels.

The polymer solution obtained in step (c) may be used for forming resist film or antireflective film, but step (d) is preferred to be conducted subsequent to step (c) so that the polymer will be even more highly purified.

<Step (d)>

In step (d), the polymer solution obtained in step (c) is mixed with a poor solvent for the polymer so that the polymer is deposited and a powdery polymer is obtained.

In step (d), the polymer solution that has been filtered in step (c) may be mixed with a poor solvent or may be diluted by a diluent to an appropriate viscosity level and then mixed with a poor solvent.

The poor solvent and the diluent used in step (d) may be the same as those used in step (b).

By filtering the precipitate deposited in the poor solvent, the polymer is obtained as a wet powder that is purified through reprecipitation. When dried, a powdery polymer is obtained.

A drying method is not limited specifically as long as the wet powder polymer is dried to have a desired moisture content. Any known drying method is employed. To facilitate the process, it is preferred to employ vacuum drying by reducing pressure under a dry atmosphere, heat drying by applying heat under a dry atmosphere, or vacuum dry heating by reducing pressure and applying heat under a dry atmosphere.

The moisture content of the powdery polymer after the drying process is preferred to be 5 mass % or lower, more preferably 3 mass % or lower, especially preferably 1 mass % or lower, from the viewpoint of performance during the lithographic process.

Effects of the Invention

According to the method for producing a polymer of the present invention as described above, after a polymer is obtained in the presence of an acid or base catalyst (step (a)), a solution containing the polymer, or a solution containing the polymer purified through reprecipitation, is set to come in contact with a mixed resin of an anion-exchange resin and a cation-exchange resin (step (b)). Thus, metal impurities (mainly light metals) and acidic and basic impurities contained in the polymer are removed.

Furthermore, subsequent to step (b), if a solution that contains the polymer after coming into contact with a mixed resin is passed through a specific filter (step (c)), metal impurities (light metals remaining after step (b) and heavy metals) contained in the polymer are removed.

In addition, if the polymer is purified through reprecipitation in step (b) or (d), unreacted monomers or the like are removed.

Therefore, according to the method for producing a polymer of the present invention, a polymer is obtained, which has low metal impurity concentrations and sufficiently reduced concentrations of acidic and basic impurities. More specifically, a highly purified polymer is obtained in which the concentration of each metal is 80 ppb or lower, preferably 50 ppb or lower, and the sum of the concentrations of acidic and basic impurities in the polymer is 50 ppm or lower.

As described, the filter to be used in step (c) is capable of removing light metals as well as heavy metals. Thus, it is possible to reduce metal impurity concentrations even when step (b) is not conducted, or step (c) is conducted before step (b).

However, if step (b) is not conducted, or step (c) is conducted before step (b), since the filter needs to remove light metals as well, the load on the filter increases. In addition, since a filter is used for filtering a solution containing the polymer with the residual acid or base catalyst and reaction terminator used in step (a), the ion exchange capability of the filter decreases, and the amount of metals to be adsorbed onto the filter is also reduced. Thus, to fully reduce metal impurity concentrations without conducting step (b) or conducting step (c) before step (b), the number of filter sheets needs to be increased. However, when the number of filter sheets increases, the efficiency of producing a polymer per filter sheet is lowered. Also, since filter sheets for removal of metal impurities are expensive, using multiple filter sheets increases production cost.

However, according to the method of the present invention, prior to filtering a solution containing a polymer, since the solution is set to come in contact with a relatively inexpensive mixed resin of an anion-exchange resin and a cation-exchange resin, the majority of the light metals and acidic and basic impurities are removed from the polymer. Then, a solution containing the polymer from which the majority of light metals and acidic and basic impurities have been removed is passed through a filter. Accordingly, the load on the filter is reduced and the number of necessary filter sheets decreases.

Therefore, according to the method for manufacturing a polymer of the present invention, a polymer is produced at high efficiency with low metal impurity concentrations along with sufficiently reduced concentrations of acidic and basic impurities.

<Polymer>

The sum of concentrations of acidic and basic impurities in the polymer of the present invention is 50 ppm or lower. If the sum of the concentrations of acidic and basic impurities is 50 ppm or lower, the polymer exhibits excellent storage stability because an increase in its molecular weight is suppressed or the like. The lower the concentrations of acidic and basic impurities, the better it is. However, if the polymer is used for antireflective film to form a bottom antireflective coating (BARC), which is formed under the resist layer, acidic or basic impurities may work as a crosslinking catalyst during the film-forming process. Thus, depending on the planned usage, a small amount of acidic or basic impurities may remain in the polymer. More specifically, the sum of concentrations of acidic and basic impurities may be 2 ppm or higher.

In addition, the concentration of each metal impurity contained in the polymer (in particular, the concentration of each of sodium, potassium, calcium and iron) is preferred to be 80 ppb or lower, more preferably 50 ppb or lower. When the concentration of each metal impurity is 80 ppb or lower, preferably 50 ppb or lower, the polymer exhibits excellent properties for use in a lithographic process.

Moreover, when the polymer is made into a thin film with a film thickness of 400 nm or less, the refractive index ("n" value) is 1.5 to 2.1 and the extinction coefficient ("k" value) is 0.1 to 0.7 at a wavelength of 193 nm. The polymer having a refractive index and extinction coefficient set within the above ranges is suitable to be used for forming antireflective film as a bottom antireflective coating (BARC) under resist film.

A refractive index and extinction coefficient are measured as follows.

First, a polymer solution is prepared by dissolving a polymer in a solvent. The polymer solution is coated on a silicon wafer to have a dry film thickness of 400 nm or less. The coated solution is then dried by baking to remove the solvent and a thin film is thereby formed. The refractive index and extinction coefficient of the obtained thin film at a wavelength of 193 nm are measured using spectroscopic ellipsometry.

The refractive index and extinction coefficient of a thin film do not show any significant difference as long as the thickness of a thin film is 400 nm or less. Thus, the film thickness is not limited specifically as long as it is 400 nm or less, but a thickness of 20 to 100 nm is preferred.

The polymer is preferred to have a crosslinking agent attached to the side chain. If a crosslinking agent is attached to the side chain, sublimation of the crosslinking agent may be prevented from causing contamination.

In addition, the polymer is preferred to be a polyester-based compound from a viewpoint of excellent etching rates and applicability to a semiconductor lithographic technology.

<Use of Polymer>

The polymer is suitable as a polymer for lithography in a lithographic process. Examples of a polymer for lithography are a polymer for resist for forming a resist film, an antireflective coating (TARC) formed on top of the resist film, or an polymer for antireflective coating to be used for forming an antireflective coating (BARC) on the bottom of the resist film, a polymer for a gap-fill film to be used for forming a gap-fill film, a polymer for top coat film to be used for forming the top coat film.

The weight-average molecular weight (Mw) of the polymer for lithographic purposes is preferred to be 1000 to 200000, more preferably 2000 to 40000. The Z-average molecular weight (Mz) is preferred to be 1000 to 400000, more preferably 2000 to 100000.

Generally, a polymer is used for forming resist film or antireflective film or the like in the form of solution.

When the aforementioned step (d) above is not conducted, the solution containing polymer obtained in step (c) may be used for various purposes without taking any further process. Alternatively, the polymer solution obtained in step (c) may be used for various purposes by being concentrated to a desired concentration, or by being diluted using a diluent listed in step (b) above.

On the other hand, when step (d) is conducted, the powdery polymer obtained in step (d) is dissolved in a solvent and used for various purposes. Solvents to dissolve the polymer are not limited specifically, and diluents listed in step (b) above may be used, for example.

The polymer solution contains highly pure polymer produced by the method of producing the polymer of the present invention. Thus, concentrations of metal impurities are low and concentrations of acidic and basic impurities are sufficiently reduced. More specifically, the concentration of each metal impurity in the polymer solution is 80 ppb or lower, preferably 50 ppb or lower, with respect to the solid content of the polymer, while concentrations of acidic and basic impurities in the polymer solution are 50 ppm or lower with respect to the solid content of the polymer.

EXAMPLES

The following Examples and Comparative Examples are those prepared by using the method for producing a polymer of the present invention. However, those Examples will not limit or reduce the scope of the present invention in any way. Also, it should be understood that conditions, parameters and values used in the Examples are not exclusive to the embodiments of the present invention. In addition, parts and percentages are based on mass unless otherwise specified.

Measurements and Evaluation

<Measuring Weight-average Molecular Weight (Mw) and Z-Average Molecular Weight (Mz)>

The weight-average molecular weight (Mw) and Z-average molecular weight (Mz) of a polymer were determined in terms of polystyrene by gel permeation chromatography (GPC) ("HLC 8220 GPC" manufactured by Tosoh Corporation).

Measurement conditions are as follows:

Measurement sample: 50 mg of dry powder/5 mL of eluent

Eluent: 1.7 mM of phosphate/THF

Separation column: "Shodex GPC K-805L" manufactured by Showa Denko K.K.

Measurement temperature: 40° C.

Detector: differential refractive index detector

<Measuring Refractive Index and Extinction Coefficient>

The refractive index and extinction coefficient of a polymer at a wavelength of 193 nm were determined as follows.

First, 0.40 grams of a dry powder polymer was dissolved in 9.60 grams of 2-hydroxyisobutyric acid methyl ester (HBM) to prepare a polymer solution.

The polymer solution was coated on a silicon wafer to have a dry film thickness of 40 nm and baked to remove the solvent so as to dry the coating. Accordingly, a thin film was obtained. The refractive index and extinction coefficient of the obtained thin film at a wavelength of 193 nm were measured using spectroscopic ellipsometry ("VUV-VASE VU-302" manufactured by J.A. Woollam Co).

<Measuring Concentration of Metal Impurities>

The concentration of each metal impurity (in terms of solid content, unit: ppb) in a polymer was determined as follows.

First, 1.5 grams of a dry powder polymer was diluted 100-fold with N-methyl-2-pyrrolidon purified by distillation to prepare a sample.

The sample was placed in an inductively coupled plasma mass spectrometer (ICP-MS) ("Agilent 7500cs" manufactured by Agilent Technologies) to analyze the metal content of sodium (Na), potassium (K), calcium (Ca) and iron (Fe), and the concentration of each metal impurity was determined.

<Measuring Concentration of Acidic Impurities>

The concentration (in terms of solid content, unit: ppm) of acidic impurities derived from the acid catalyst (pTSA) in a polymer was determined as follows.

First, 1.0 gram of a dry powder polymer was dissolved in a mixed solution of 21 mL of acetonitrile and 9 mL of water to prepare a sample.

The concentration of acidic impurities (residual pTSA) of the sample was measured by high performance chromatography (HPLC: "LC-20A" manufactured by Shimadzu Rika Corporation, separation column: "Intersil ODS-2" manufactured by GL Science Inc.)

<Measuring Concentration of Basic Impurities>

The concentration (in terms of solid content, unit: ppm) of basic impurities derived from reaction terminator (basic compound: triethylamine) in a polymer was determined as follows.

First, 1.0 gram of a dry powder polymer was dissolved in a mixed solution of 21 mL of acetonitrile and 9 mL of water to prepare a sample.

The concentration of basic impurities (residual triethylamine) of the sample was measured by gas chromatography (GC: "Agilent 7890A GC System" manufactured by Agilent Technologies, separation column: "Agilent HP-INNO-WAX" manufactured by Agilent Technologies).

<Testing Storage Stability>

Storage stability test was carried out as follows.

First, 8.0 grams of HBM was added to 2.0 grams of a dry powder polymer to prepare a five-fold dilution.

The sample was kept at 50° C., and a portion of the sample was collected each time after 8 hours, 24 hours and 48 hours had elapsed. Then, the molecular weight of each portion was measured in the same manner described above for the weight-average molecular weight (Mw) and Z-average molecular weight (Mz).

Synthesis Example 1

First, the following were filled in a three-neck flask: 1,3,5-tris(2-hydroxyethyl)isocyanurate (67.12 grams, 0.258 mol), 2,3-naphthalenedicarboxylic acid dimethyl (63.01 grams, 0.258 mol), p-toluenesulfonic acid hydrate (pTSA) (2.606 grams, 13.7 mmol), and anisole (79.60 grams). Then, the mixture underwent polymerization at 130° C. for 8 hours while dehydration and de-methanol reactions using Dean-Stark trap were carried out. The mixture was cooled to 50° C. and reactions were stopped by adding triethylamine (1.386 grams, 13.7 mmol) (step (a)).

The polymerized solution was diluted with tetrahydrofuran (THF) (89.4 grams) and a diluted solution was obtained. Then, the diluted solution was added to a mixture (poor solvent) of hexane (580.0 grams) and 2-propanol (IPA) (1740.0 grams), and was reprecipitated (purification through reprecipitation in step (b)). Accordingly, a polyester-based polymer 1 (weight-average molecular weight (Mw): 6300, Z-average molecular weight (Mz): 12500, an approximate yield of 50%) with a structural unit represented by the formula (1) below was obtained.

[Chemical formula 1]

Synthesis Example 2

First, the following were filled in a three-neck flask: 1,3,5-tris(2-hydroxyethyl)isocyanurate (67.12 grams, 0.258 mol), 2,3-naphthalenedicarboxylic acid dimethyl (63.01 grams, 0.258 mol), pTSA (2.606 grams, 13.7 mmol), and anisole (79.60 grams). Then, the mixture underwent polymerization at 130° C. for 8 hours while dehydration and de-methanol reactions using Dean-Stark trap were carried out. Next, the mixture was diluted with THF (89.4 grams), and tetramethoxy glycoluril (TMGU) (25.64 grams, 80.55 mmol) was added to the mixture to carry out reactions at 20° C. for 6 hours. Then, reactions were stopped by adding triethylamine (1.386 grams, 13.7 mmol) (step (a)).

The polymerized solution was added to a mixture (poor solvent) of hexane (580.0 grams) and IPA (1740.0 grams), and was reprecipitated (purification through reprecipitation in step (b)). Accordingly, a polyester-based polymer 2 (weight-average molecular weight (Mw): 7100, Z-average molecular weight (Mz): 14000, an approximate yield of 40%) with a structural unit represented by the formulas (2) and (3) below was obtained.

[Chemical formula 2]

-continued (3)

Example 1-1

A mixed resin was prepared using an anion-exchange resin ("Amberlyst B20-HG·Dry" manufactured by Organo Corporation, total exchange capacity of 4.6 mg equivalent/g or greater, moisture content of 10% or less, apparent density of 400 g/L) (33.25 grams) and a cation-exchange resin ("Amberlyst 15JS-HG·Dry" manufactured by Organo, total exchange capacity of 4.7 mg equivalent/g or greater, moisture content of 2% or less, apparent density of 590 g/L) (1.75 grams). Next, the mixed resin was cleansed with THF and dried. A solution was prepared by dissolving 63.00 grams of polyester-based polymer 1 obtained in Synthesis Example 1 in 147.0 grams of THF, and was added to the dried mixed resin, which was then stirred for 5 hours to remove the acid catalyst (pTSA), the reaction terminator (triethylamine) and metal impurities. After that the mixed resin was removed (step (b)).

A filter sheet ("CUNO™ Zeta Plus™ filter cartridge EC GN grade" φ 90 mm, manufactured by Sumitomo 3M) was cleansed with ultrapure water (5000 mL) and THF (1000 mL), and the polymer solution, which had made contact with the mixed resin, passed through the filter sheet so that metal impurities were further removed (step (c)).

The polymer solution after the above filtration was reprecipitated by adding the solution to a mixture (poor solvent) of hexane (580.0 grams) and IPA (1740.0 grams), and a precipitate was obtained. The precipitate was vacuum-dried at 40° C. for 60 hours to achieve a powdery polyester-based polymer (step (d)).

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 1.

Figure 1:
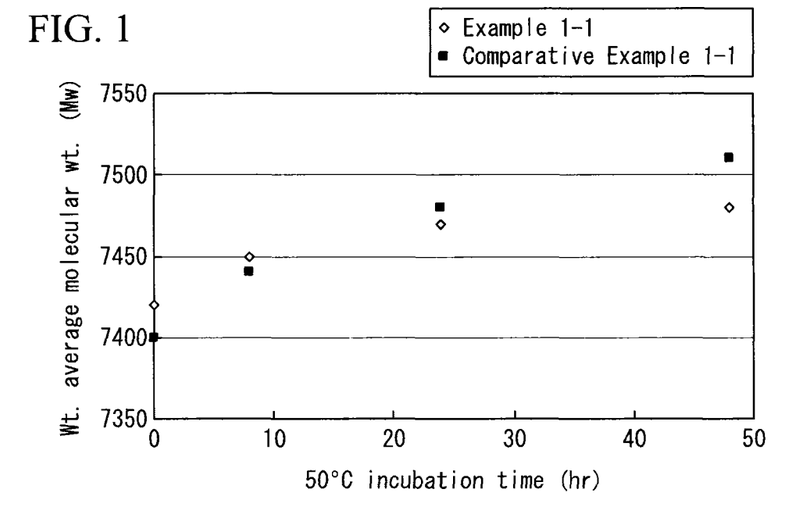
FIG. 1 is a graph showing storage stability test results of Example 1-1 and Comparative Example 1-1.
Figure 2:
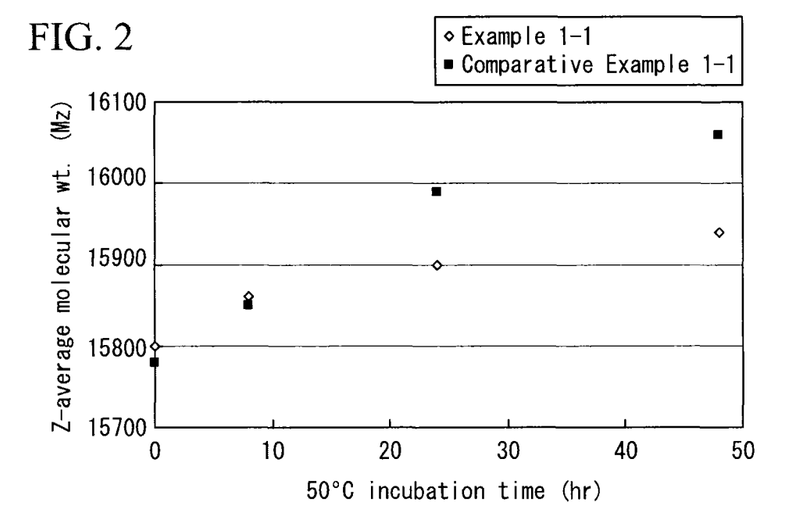
FIG. 2 is a graph showing storage stability test results of Example 1-1 and Comparative Example 1-1.

Moreover, the weight-average molecular weight (Mw) and Z-average molecular weight (Mz) were measured according to the above storage stability testing method. The results are shown in Table 3 and FIGS. 1 and 2.

Example 1-2

A powdery polyester-based polymer was prepared the same as in Example 1-1 except that step (c) was not conducted.

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 1.

Moreover, the weight-average molecular weight (Mw) and Z-average molecular weight (Mz) were measured according to the above storage stability testing method. The results are shown in Table 3.

Example 2-1

A powdery polyester-based polymer was prepared the same as in Example 1-1 by conducting steps (b) to (d) except that polyester-based polymer 2 obtained in Synthesis Example 2 was used.

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 2.

Figure 3:
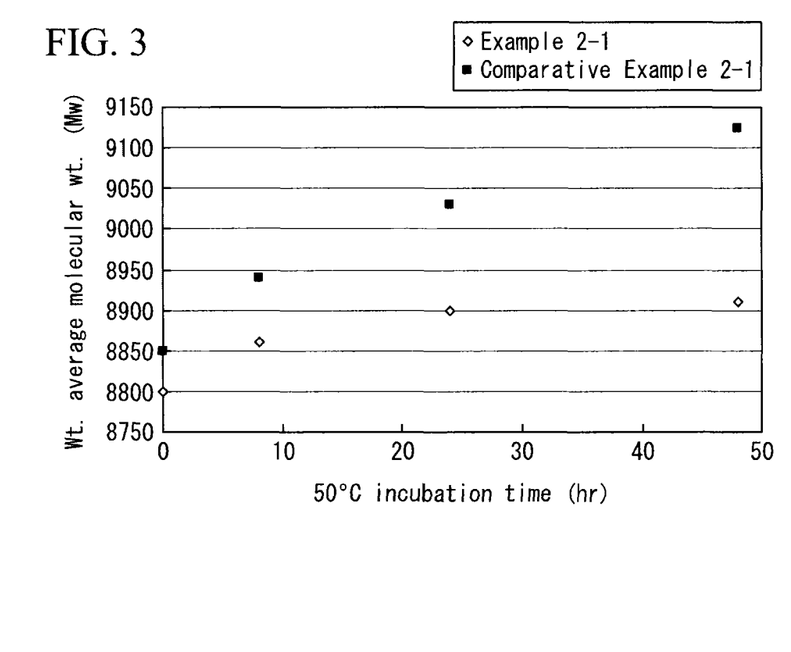
FIG. 3 is a graph showing storage stability test results of Example 2-1 and Comparative Example 2-1.
Figure 4:
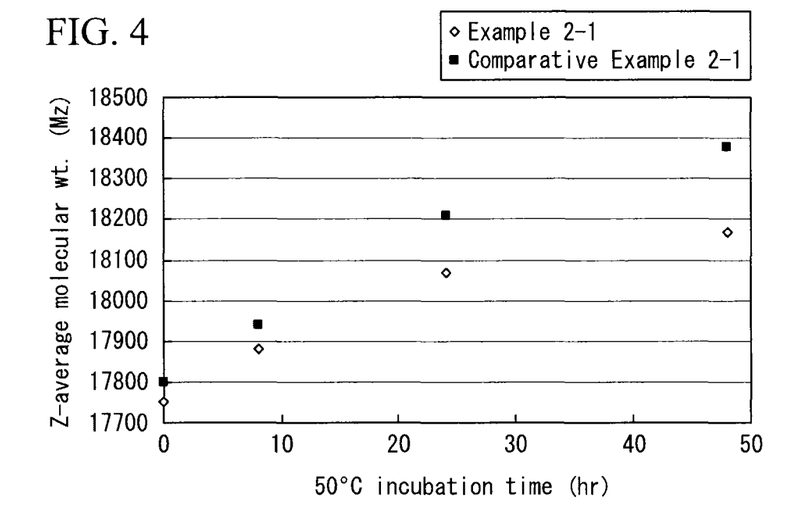
FIG. 4 is a graph showing storage stability test results of Example 2-1 and Comparative Example 2-1.

Moreover, the weight-average molecular weight (Mw) and Z-average molecular weight (Mz) were measured according to the above storage stability testing method. The results are shown in Table 4 and FIGS. 3 and 4.

Example 2-2

A powdery polyester-based polymer was prepared the same as in Example 1-1 except that polyester-based polymer 2 obtained in Synthesis Example 2 was used and step (c) was not conducted.

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 2.

Moreover, the weight-average molecular weight (Mw) and Z-average molecular weight (Mz) were measured according to the above storage stability testing method. The results are shown in Table 4.

Comparative Example 1-1

A powdery polyester-based polymer was prepared the same as in Example 1-1 except that a cation-exchange resin was not used in step (b) and step (c) was not conducted.

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 1.

Moreover, the weight-average molecular weight (Mw) and Z-average molecular weight (Mz) were measured according to the above storage stability testing method. The results are shown in Table 3 and FIGS. 1, 2.

Comparative Example 1-2

A powdery polyester-based polymer was prepared the same as in Example 1-1 except that a cation-exchange resin was not used in step (b).

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 1.

Moreover, the weight-average molecular weight (Mw) and Z-average molecular weight (Mz) were measured according to the above storage stability testing method. The results are shown in Table 3.

Comparative Example 2-1

A powdery polyester-based polymer was prepared the same as in Example 1-1 except that polyester-based polymer 2 obtained in Synthesis Example 2 was used, a cation-exchange resin was not used in step (b) and step (c) was not conducted.

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 2.

Moreover, the weight-average molecular weight (Mw) and Z-average molecular weight (Mz) were measured according to the above storage stability testing method. The results are shown in Table 4 and FIGS. 3, 4.

Comparative Example 2-2

A powdery polyester-based polymer was prepared the same as in Example 1-1 except that polyester-based polymer 2 obtained in Synthesis Example 2 was used and a cation-exchange resin was not used in step (b).

The polyester-based polymer was analyzed to determine its weight-average molecular weight (Mw), Z-average molecular weight (Mz), refractive index, extinction coefficient, concentration of each metal impurity, residual pTSA concentration, and residual triethylamine concentration. The results are shown in Table 2.

Moreover, the weight-average molecular weight (Mw) and Z-average molecular weight (Mz) were measured according to the above storage stability testing method. The results are shown in Table 4.

TABLE 1

| | | Example 1-1 | Example 1-2 | Comp. Example 1- | Comp. Example 1- |
|---|---|---|---|---|---|
| anion-exchange resin | | used | used | used | used |
| cation-exchange resin | | used | used | not used | not used |
| filter sheet | | used | not used | not used | used |
| order of steps | | (a)→(b)→(c)→(d) | (a)→(b)→(d) | (a)→(b')→(d) | (a)→(b')→(c)→(d) |
| wt. average molecular wt. (Mw) | | 7420 | 7330 | 7400 | 7320 |
| Z-average molecular wt. (Mz) | | 15800 | 15720 | 15780 | 15720 |
| refractive index | | 1.83 | 1.83 | 1.83 | 1.83 |
| extinction coefficient | | 0.16 | 0.16 | 0.16 | 0.16 |
| impurity concentration | Na [ppb] | 25 | 80 | 155 | 75 |
| | K [ppb] | 15 | 25 | 30 | 25 |
| | Ca [ppb] | 20 | 35 | 50 | 30 |
| | Fe [ppb] | 30 | 70 | 80 | 35 |
| | residual pTSA [ppm] | 40 | 40 | 40 | 40 |
| | residual triethylamine [ppm] | <5 | <5 | 500 | 300 |

TABLE 2

| | | Example 2-1 | Example 2-2 | Comp. Example 2- | Comp. Example 2- |
|---|---|---|---|---|---|
| anion-exchange resin | | used | used | used | used |
| cation-exchange resin | | used | used | not used | not used |
| filter sheet | | used | not used | not used | used |
| order of steps | | (a)→(b)→(c)→(d) | (a)→(b)→(d) | (a)→(b')→(d) | (a)→(b')→(c)→(d) |
| wt. average molecular wt. (Mw) | | 8800 | 8750 | 8850 | 8750 |
| Z-average molecular wt. (Mz) | | 17750 | 17600 | 17800 | 17650 |
| refractive index | | 1.86 | 1.86 | 1.86 | 1.86 |
| extinction coefficient | | 0.21 | 0.21 | 0.21 | 0.21 |
| impurity concentration | Na [ppb] | 20 | 70 | 140 | 60 |
| | K [ppb] | 7 | 12 | 25 | 20 |
| | Ca [ppb] | 20 | 30 | 45 | 25 |
| | Fe [ppb] | 30 | 60 | 70 | 35 |
| | residual pTSA [ppm] | 30 | 30 | 30 | 30 |
| | residual triethylamine [ppm] | <5 | <5 | 350 | 250 |

TABLE 3

|  |  |  | Example 1-1 | Example 1-2 | Comp. Example 1- | Comp. Example 1- |
|---|---|---|---|---|---|---|
| storage stability test | 8 hours | wt. average molecular wt. (Mw) | 7450 | 7330 | 7440 | 7320 |
|  |  | Z-average molecular wt. (Mz) | 15860 | 15720 | 15850 | 15720 |
|  | 24 hours | wt. average molecular wt. (Mw) | 7470 | 7350 | 7480 | 7350 |
|  |  | Z-average molecular wt. (Mz) | 15900 | 15800 | 15990 | 15800 |
|  | 48 hours | wt. average molecular wt. (Mw) | 7480 | 7360 | 7510 | 7380 |
|  |  | Z-average molecular wt. (Mz) | 15940 | 15820 | 16060 | 15850 |

TABLE 4

|  |  |  | Example 2-1 | Example 2-2 | Comp. Example 2- | Comp. Example 2- |
|---|---|---|---|---|---|---|
| storage stability test | 8 hours | wt. average molecular wt. (Mw) | 8860 | 8750 | 8940 | 8750 |
|  |  | Z-average molecular wt. (Mz) | 17880 | 17600 | 17940 | 17650 |
|  | 24 hours | wt. average molecular wt. (Mw) | 8900 | 8790 | 9030 | 8830 |
|  |  | Z-average molecular wt. (Mz) | 18070 | 17700 | 18210 | 17800 |
|  | 48 hours | wt. average molecular wt. (Mw) | 8910 | 8800 | 9130 | 8920 |
|  |  | Z-average molecular wt. (Mz) | 18170 | 17750 | 18380 | 18100 |

In the tables above, when a cation-exchange resin was not used in step (b), it is indicated as "(b')."

As is clear in tables 1 and 2, highly purified polymers are obtained in Examples 1-1 and 2-1, where the concentration of each metal impurity was 50 ppb or lower, and the sum of the concentrations of residual pTSA and residual triethylamine was 50 ppm or lower.

Compared with Examples 1-1 and 2-1, metal impurity concentrations were slightly higher in Examples 1-2 and 2-2 where step (c) was not conducted.

Meanwhile, compared with Examples 1-2 and 2-2, metal impurity concentrations were even higher in Comparative Examples 1-1 and 2-1 where a cation-exchange resin was not used in step (b) and where step (c) was not conducted. Especially, the light-metal concentration of sodium was high. Also, the residual triethylamine concentration was high.

In Comparative Examples 1-2 and 2-2 where no cation-exchange resin was used in step (b), the light-metal concentration of sodium was high compared with Examples 1-1 and 2-1. Also, the residual triethylamine concentration was high. However, since step (c) was conducted in Comparative Examples 1-2 and 2-2, the heavy-metal concentration of iron was reduced.

Based on the above results, it was found that in step (b), acidic impurities were removed by an anion-exchange resin while basic impurities and metal impurities (mostly light metals) were removed by a cation-exchange resin.

In addition, it was found that metal impurities (heavy metals, and light metals that were not completely removed in step (b)) were removed by using a specific filter in step (c).

Moreover, it was found that if step (c) is conducted prior to step (b), the ion-exchange capacity of a filter to be used in step (c) was lowered by acidic impurities, making it harder to fully remove metal impurities by using the filter.

Also, as is clear in Tables 1 to 4 and FIGS. 1 to 4, because of low residual amounts of the acid catalyst (pTSA) and basic compound (triethylamine), it was found that an increase in the molecular weight during storage was suppressed in Examples 1-1 and 2-1, and their storage stability was excellent.

On the other hand, because of high residual contents of the acid catalyst and basic compound in a polymer in Comparative Examples 1-1 and 2-1, it was found that the molecular weight tended to increase during storage and that storage stability was low.

Synthesis Example 3

First, the following were filled in a three-neck flask: 1,3,5-tris(2-hydroxyethyl) isocyanurate (33.56 grams, 0.129 mol), 1,2-cyclohexane dicarboxylic acid diethyl (29.45 grams, 0.129 mol), pTSA (1.303 grams, 6.85 mmol), and anisole (39.80 grams). Then, the mixture underwent polymerization at 135° C. for 10 hours while dehydration and de-ethanol reactions using a Dean-Sark trap were carried out. The mixture was diluted with 44.7 grams of THF, and TMGU (12.81 grams, 40.24 mmol) was added and reacted at 20° C. for 5.5 hours. Then, the reaction was stopped by adding triethylamine (0.6932 grams, 6.85 mmol) (step (a)).

The polymerized solution was added to a mixture (poor solvent) of hexane (290.0 grams) and IPA (870.0 grams), and was reprecipitated (purification through reprecipitation in step (b)). Accordingly, a polyester-based polymer 3 with a crosslinking agent attached to the side chain (weight-average molecular weight (Mw): 7500, Z-average molecular weight (Mz): 14200, an approximate yield of 40%) with a structural unit represented by formulas (4) and (5) below was obtained.

[Chemical formula 3]

Example 3-1

A powdery polyester-based polymer was prepared the same as in Example 1-1 except that polyester-based polymer 3 obtained in Synthesis Example 3 was used and step (c) was not conducted.

The polyester-based polymer was analyzed to determine its weight-average molecular weight (Mw), Z-average molecular weight (Mz), concentration of each metal impurity, residual pTSA concentration, and residual triethylamine concentration. The results are shown in Table 5.

In addition, the polyester-based polymer 3 obtained in Synthesis Example 3 (namely, after reprecipitation purification in step (b)) was analyzed to determine its weight-average molecular weight (Mw), Z-average molecular weight (Mz), concentration of each metal impurity, residual pTSA concentration, and residual triethylamine concentration. The results are shown in Table 5.

Comparative Example 3-1

In 147.0 grams of THF, 63.00 grams of the polyester-based polymer 3 obtained in Synthesis Example 3 was dissolved, and the solution was added to a cation-exchange resin ("Amberlyst 15JS-HG·Dry" manufactured by Organo, total exchange capacity of 4.7 mg equivalent/g or greater, moisture content of 2% or less, apparent density of 590 g/L) (1.75 grams). The mixture was stirred for 5 hours. After the cation-exchange resin was removed, an anion-exchange resin ("Amberlyst B20-HG·Dry" manufactured by Organo Corporation, total exchange capacity of 4.6 mg equivalent/g or greater, moisture content of 10% or less, apparent density of 400 g/L) (33.25 grams) was added to the mixture, which was then stirred for 5 hours. After the anion-exchange resin was removed, the same process as in step (d) of Example 1-1 was conducted and a powdery polyester-based polymer was obtained.

The polyester-based polymer was analyzed to determine its weight-average molecular weight (Mw), Z-average molecular weight (Mz), concentration of each metal impurity, residual pTSA concentration, and residual triethylamine concentration. The results are shown in Table 5.

TABLE 5

| | | after reprecipitation purification in step (b) | Example 3-1 | Comp. Example 3- |
|---|---|---|---|---|
| wt. average molecular wt. (Mw) | | 7500 | 8500 | 9500 |
| Z-average molecular wt. (Mz) | | 14200 | 17000 | 20000 |
| impurity concentration | Na [ppb] | 90 | 40 | 40 |
| | K [ppb] | 20 | 10 | 10 |
| | Ca [ppb] | 90 | 40 | 40 |
| | Fe [ppb] | 40 | 40 | 40 |
| | residual pTSA [ppm] | 1500 | 40 | 40 |
| | residual triethylamine [ppm] | 700 | <5 | <5 |

As is clear in Table 5, a highly purified polymer was obtained in Example 3-1, where the concentration of each metal impurity was 50 ppb or lower, and the sum of the concentrations of residual pTSA and residual triethylamine was 50 ppm or lower.

By contrast, the polymer obtained in Comparative Example 3-1 shows a significant change in the molecular weight after the polymer was purified through reprecipitation and was subject to coming into contact with ion-exchange resin in step (b). Since desired properties are hard to achieve if change in molecular weight occurs, such a polymer is not suitable for use in a lithographic process.

POTENTIAL INDUSTRIAL APPLICABILITY

The method for producing a polymer related to the present invention is capable of efficiently reducing both metal impurity concentrations and concentrations of acidic and basic impurities. The polymer obtained by the production method of the present invention exhibits excellent properties as a polymer for lithographic process. Moreover, the polymer is capable of controlling a refractive index and an extinction coefficient that may adversely affect lithographic performance.

The invention claimed is:

1. A method for producing a polymer, the method comprising:
producing a polymer by polymerizing monomers in the presence of an acid catalyst, terminating the polymerization using a basic compound and attaching a crosslinking agent to a side chain of the polymer;
subsequently contacting a solution comprising the polymer with a mixed resin of an anion-exchange resin and a cation-exchange resin, to reduce residual metal impurities, acidic impurities, and basic impurities to a level such that a sum of concentrations of acidic and basic impurities is 50 ppm or lower; and metal impurity concentrations of sodium, potassium, calcium and iron are each 80 ppb or lower,
subsequently passing the solution comprising the polymer through a filter that does not comprise a strongly acidic ion-exchange group but comprises a charge control agent for generating zeta potential,
wherein the acid catalyst is p-tolulenesulfonic acid, and a mass ratio of the anion exchange resin to the cation-exchange resin is from 60/40 to 99/1.

2. The method according to claim 1, wherein the polymer is a polyester-based polymer.

3. The method according to claim 1, further comprising:
subsequently producing a powdery polymer by mixing the solution comprising the polymer and a poor solvent for the polymer so that the polymer is deposited.

4. The method according to claim 1, wherein the filter is a filter sheet, and an average pore diameter of the filter sheet is 0.5 to 10 μm.

5. The method according to claim 4, further comprising:
subsequently producing a powdery polymer by mixing the solution comprising the polymer and a poor solvent for the polymer so that the polymer is deposited.

6. A method for producing a polymer, comprising:
producing a polymer by polymerizing monomers in the presence of a base catalyst, terminating the polymerization using an acidic compound, and attaching a crosslinking agent to a side chain of the polymer;
subsequently contacting a solution comprising the polymer with a mixed resin of an anion-exchange resin and a cation-exchange resin, to reduce residual metal impurities, acidic impurities, and basic impurities to a level such that a sum of concentrations of acidic and basic impurities is 50 ppm or lower; and metal impurity concentrations of sodium, potassium, calcium and iron are each 80 ppb or lower, and
subsequently passing the solution comprising the polymer through a filter that does not comprise a strongly acidic ion-exchange group but comprises a charge control agent for generating zeta potential,
wherein the base catalyst is a tertiary amine.

7. The method according to claim 1, wherein prior to passing the solution comprising the polymer through the filter that does not comprise a strongly acidic ion-exchange group but comprises a charge control agent for generating zeta potential the filter is cleaned using ultrapure water and a solvent of the solution.

8. A method for producing a polymer, the method comprising:
producing a polymer by polymerizing monomers in the presence of a base catalyst, terminating the polymerization using an acidic compound, and attaching a crosslinking agent to a side chain of the polymer; and
subsequently contacting a solution comprising the polymer with a mixed resin of an anion-exchange resin and a cation-exchange resin, to reduce residual metal impurities, acidic impurities, and basic impurities to a level such that a sum of concentrations of acidic and basic impurities is 50 ppm or lower; and metal impurity concentrations of sodium, potassium, calcium and iron are each 80 ppb or lower,
wherein the base catalyst is a tertiary amine.

9. The method according to claim 8, wherein a mass ratio of the anion-exchange resin to the cation-exchange resin is from 60/40 to 99/1.

10. The method according to claim 8, wherein the polymer is a polyester-based polymer.

11. The method according to claim 8, further comprising:
subsequently producing a powdery polymer by mixing the solution comprising the polymer and a poor solvent for the polymer so that the polymer is deposited.

* * * * *